(12) United States Patent
Fatemi et al.

(10) Patent No.: US 11,043,875 B2
(45) Date of Patent: Jun. 22, 2021

(54) TEMPERATURE CONTROL ASSEMBLY FOR AN ELECTRIC MACHINE

(71) Applicant: GM GLOBAL TECHNOLOGY OPERATIONS LLC, Detroit, MI (US)

(72) Inventors: Alireza Fatemi, Rochester Hills, MI (US); Xiaofeng Yang, Troy, MI (US); Thomas W. Nehl, Shelby Township, MI (US); Farzad Samie, Franklin, MI (US); Srihari K. Gangaraj, Pasadena, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 14 days.

(21) Appl. No.: 16/196,379

(22) Filed: Nov. 20, 2018

(65) Prior Publication Data
US 2020/0161938 A1 May 21, 2020

(51) Int. Cl.
*H02K 9/197* (2006.01)
*H02K 5/20* (2006.01)
*H02K 1/20* (2006.01)
*H02K 9/19* (2006.01)

(52) U.S. Cl.
CPC ............ *H02K 9/197* (2013.01); *H02K 5/20* (2013.01); *H02K 1/20* (2013.01); *H02K 9/19* (2013.01)

(58) Field of Classification Search
CPC ............ H02K 9/197; H02K 5/20; H02K 1/20; H02K 3/24; H02K 9/00; H02K 9/005; H02K 9/12; H02K 9/16; H02K 9/18; H02K 9/19; H02K 9/193

USPC ..................................................... 310/54, 64
See application file for complete search history.

(56) References Cited

U.S. PATENT DOCUMENTS

| | | | | |
|---|---|---|---|---|
| 4,864,173 A * | 9/1989 | Even | .................. | B60L 7/10 310/93 |
| 5,939,808 A * | 8/1999 | Adames | .................. | H02K 9/19 310/54 |
| 6,222,289 B1 * | 4/2001 | Adames | .................. | H02K 5/20 310/52 |
| 8,616,831 B2 * | 12/2013 | Wollstadt | ............ | F04D 25/0606 415/104 |
| 2005/0151431 A1 * | 7/2005 | Cronin | .................. | H02K 5/20 310/60 A |
| 2007/0013241 A1 * | 1/2007 | Schiferl | .................. | H02K 1/32 310/54 |
| 2009/0127946 A1 * | 5/2009 | Fee | .................. | H02K 5/20 310/64 |

(Continued)

*Primary Examiner* — Ahmed Elnakib
(74) *Attorney, Agent, or Firm* — Cantor Colburn LLP

(57) ABSTRACT

An apparatus for cooling an electric machine includes a plurality of fluid channels disposed in a first surface that surrounds at least part of the electric machine. Each of the plurality of fluid channels defines a circumferential path in the first surface, including a first channel section extending at least substantially parallel to first and second circumferences defined by ends of the electric machine, and including a second channel section configured to direct a cooling fluid between a central region of the first surface and an end region of the first surface. The apparatus also includes an outer shell configured to surround the first surface and define a fluid tight chamber between the first surface and the outer shell, the outer shell having at least one inlet through which the cooling fluid is introduced into the chamber and at least one outlet from which the cooling fluid exits the volume.

20 Claims, 7 Drawing Sheets

(56) References Cited

U.S. PATENT DOCUMENTS

2014/0175920 A1* 6/2014 Cimatti .................. H02K 5/20
  310/54
2019/0363598 A1* 11/2019 Coppola ................. H02K 3/24
2020/0161938 A1* 5/2020 Fatemi .................. H02K 9/197

* cited by examiner

TEMPERATURE CONTROL ASSEMBLY FOR AN ELECTRIC MACHINE

INTRODUCTION

The subject matter disclosed herein generally relates to electric machines and, more particularly, to systems, apparatuses and methods for temperature control of electric machines.

Electric machines are commonly utilized in vehicle systems to perform a variety of functions. Examples of vehicle systems that use electric machines include vehicle propulsion systems and actuation systems for doors, windows, environmental control systems and other components of a vehicle.

Temperature control techniques are often employed to regulate the temperature of an electric machine or parts thereof. Various cooling systems can be used to control or reduce temperatures and temperature gradients, to prevent overheating that can degrade performance and result in the electric machine operating below specifications. Examples of cooling systems include air cooling, water cooling and oil cooling systems.

Accordingly, it is desirable to provide an improved cooling apparatus or system for electric machines.

BRIEF DESCRIPTION

In one exemplary embodiment, an apparatus for cooling an electric machine includes a plurality of fluid channels disposed in a first surface that surrounds at least part of the electric machine, the electric machine including a rotor surrounded by a cylindrical stator, the rotor and the stator having a central longitudinal axis. The electric machine has a first end and a second end, the first end defining a first circumference around the longitudinal axis and the second end opposing the first end and defining a second circumference around the longitudinal axis. Each of the plurality of fluid channels defines a circumferential path in the first surface, including a first channel section that extends at least substantially parallel to the first circumference and the second circumference, and including a second channel section configured to direct a cooling fluid between a central region of the first surface and an end region of the first surface. The apparatus also includes an outer shell configured to surround the first surface and define a fluid tight chamber between the first surface and the outer shell, the plurality of fluid channels extending circumferentially through the chamber, the outer shell having at least one inlet through which the cooling fluid is introduced into the chamber and at least one outlet from which the cooling fluid exits the volume.

In addition to one or more of the features described herein, the at least one inlet includes a first inlet disposed proximate to a first end region of the first surface and a second inlet disposed proximate to a second end region of the first surface, and the at least one outlet is disposed proximate to the central region.

In addition to one or more of the features described herein, the at least one inlet is disposed proximate to the central region, and the at least one outlet includes a first outlet disposed proximate to a first end region of the first surface and a second outlet disposed proximate to a second end region of the first surface.

In addition to one or more of the features described herein, the cooling fluid is oil, the stator includes a plurality of windings having opposing end windings and a stator yoke, and the first outlet and the second outlet are configured as end winding oil drip outlets.

In addition to one or more of the features described herein, the plurality of fluid channels are formed by a plurality of ribs that establish circumferential fluid paths on the first surface.

In addition to one or more of the features described herein, each of the plurality of ribs includes a straight portion that is at least substantially parallel to the first circumference and the second circumference, and a curved portion that extends toward the central region.

In addition to one or more of the features described herein, the apparatus further includes an inner shell surrounding the stator and disposed between the stator and the outer shell, the inner shell defining the first surface.

In addition to one or more of the features described herein, the outer shell and the inner shell define the fluid tight chamber, and the fluid channels are bounded within the fluid tight chamber.

In addition to one or more of the features described herein, the stator includes a plurality of windings and a stator yoke, and the first surface includes an outer surface of the stator yoke, the plurality of fluid channels formed on the outer surface of the stator yoke.

In addition to one or more of the features described herein, the fluid channels are formed by laminations making up the stator yoke.

In addition to one or more of the features described herein, the cooling fluid is at least one of an oil-based fluid and a water-based fluid.

In addition to one or more of the features described herein, the electric machine is a synchronous motor, a synchronous generator, an induction motor and/or an induction generator.

In addition to one or more of the features described herein, the electric machine is configured to be a component of a motor vehicle.

In another exemplary embodiment, an apparatus for cooling an electric machine includes a plurality of fluid channels disposed in a first surface that surrounds at least part of the electric machine, the electric machine including a rotor surrounded by a cylindrical stator, the rotor and the stator having a central longitudinal axis. The electric machine has a first end and a second end, the first end defining a first circumference around the longitudinal axis, the second end opposing the first end and defining a second circumference around the longitudinal axis. Each of the plurality of fluid channels defines a circumferential path in the first surface, the plurality of fluid channels configured to direct a cooling fluid between a central region of the first surface and an end region of the first surface. The apparatus also includes an outer shell configured to surround the first surface and define a fluid tight chamber between the first surface and the outer shell. The plurality of fluid channels extend circumferentially through the chamber, the outer shell having at least one inlet through which the cooling fluid is introduced into the chamber and at least one outlet from which the cooling fluid exits the chamber. The at least one inlet includes a first inlet disposed proximate to a first end region of the first surface and a second inlet disposed proximate to a second end region of the first surface, or the at least one outlet includes a first outlet disposed proximate to the first end region and a second outlet disposed proximate to the second end region.

In addition to one or more of the features described herein, the at least one inlet or the at least one outlet is disposed proximate to the central region.

In addition to one or more of the features described herein, each of the plurality of fluid channels includes a first channel section that extends at least substantially parallel to the first circumference and the second circumference, and includes a second channel section configured to direct the cooling fluid between the central region and the first end region or the second end region.

In addition to one or more of the features described herein, the apparatus also includes an inner shell surrounding the stator and disposed between the stator and the outer shell, the inner shell defining the first surface. The outer shell and the inner shell define the fluid tight chamber, and the fluid channels are bounded within the fluid tight chamber.

In addition to one or more of the features described herein, the stator includes a plurality of windings and a stator yoke, and the first surface includes an outer surface of the stator yoke, the plurality of fluid channels formed on the outer surface of the stator yoke.

In a further exemplary embodiment, an apparatus for cooling an electric machine includes a plurality of fluid channels disposed in a first surface that surrounds at least part of the electric machine, the electric machine including a rotor surrounded by a cylindrical stator, the rotor and the stator having a central longitudinal axis. The electric machine has a first end and a second end, the first end defining a first circumference around the longitudinal axis, the second end opposing the first end and defining a second circumference around the longitudinal axis. Each of the plurality of fluid channels defines a circumferential path in the first surface, one or more of the plurality of fluid channels configured to direct a cooling fluid between a central region of the first surface and an end region of the first surface. The apparatus also includes an outer shell configured to surround the first surface and define a fluid tight chamber between the first surface and the outer shell. The plurality of fluid channels extend circumferentially through the chamber, the outer shell having at least one inlet through which the cooling fluid is introduced into the chamber and at least one outlet from which the cooling fluid exits the chamber. The at least one inlet includes a first inlet disposed proximate to a first end region of the first surface and a second inlet disposed proximate to a second end region of the first surface, and the at least one outlet is disposed proximate to the central region.

In addition to one or more of the features described herein, each of the plurality of fluid channels includes a first channel section that extends at least substantially parallel to the first circumference and the second circumference, and includes a second channel section configured to direct the cooling fluid between the central region and the first end region or the second end region.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

In accordance with one or more exemplary embodiments, apparatuses, systems and methods are provided for cooling of electric machines. An embodiment of a cooling apparatus or assembly includes a plurality of cooling channels formed within a chamber that surrounds an electric machine. In one embodiment, the cooling channels are defined by ridges or ribs on a cooling surface that surrounds a stator of the electric machine. The chamber may be defined by an outer cylindrical shell that is attached to and forms a fluid tight seal with the inner surface.

The cooling surface, in one embodiment, is a surface of an inner shell having a plurality of ridges or ribs that are fixedly disposed on the surface. For example, the ridges or ribs are attached to the surface or are integral components of the inner shell. In another embodiment, the cooling surface is a surface of the stator, and the cooling channels are defined by ridges or ribs (or other features) that are attached to the surface of the stator yoke or integral with the stator yoke (e.g., the cooling channels are formed by laminations that make up the stator yoke).

In one embodiment, the cooling channels are configured to circulate cooling fluid (e.g., water or oil) around the electric machine along fluid paths that extend circumferentially within the chamber. The cooling channels direct cooling fluid from a central region toward end regions of the chamber, or direct cooling fluid from the end regions toward the central region. One or more inlets and one or more outlets are positioned on the outer shell to introduce cooling fluid into the chamber and to collect the cooling fluid after the cooling fluid has circulated along the fluid paths. For example, an inlet is positioned at the central region and outlets are positioned at the end regions. In another example, inlets are positioned at the end regions and cooling fluid is collected via an outlet at the central region.

Embodiments described herein provide a number of advantages and technical effects. Embodiments of the cooling assembly, including the cooling channels and the configurations of inlets and outlets, ensure effective cooling of the stator surface of an electric machine, to prevent overheating that can lead to performance degradation. Further-more, embodiments of the configuration and shape of the cooling channels prevent the formation of dead zones that inhibit the ability of the cooling fluid to move heat away from the stator. Other advantages include improved effective heat transfer coefficients, lower end winding temperatures, increased durability and life of insulations, and improved motor efficiency.

Figure 1:
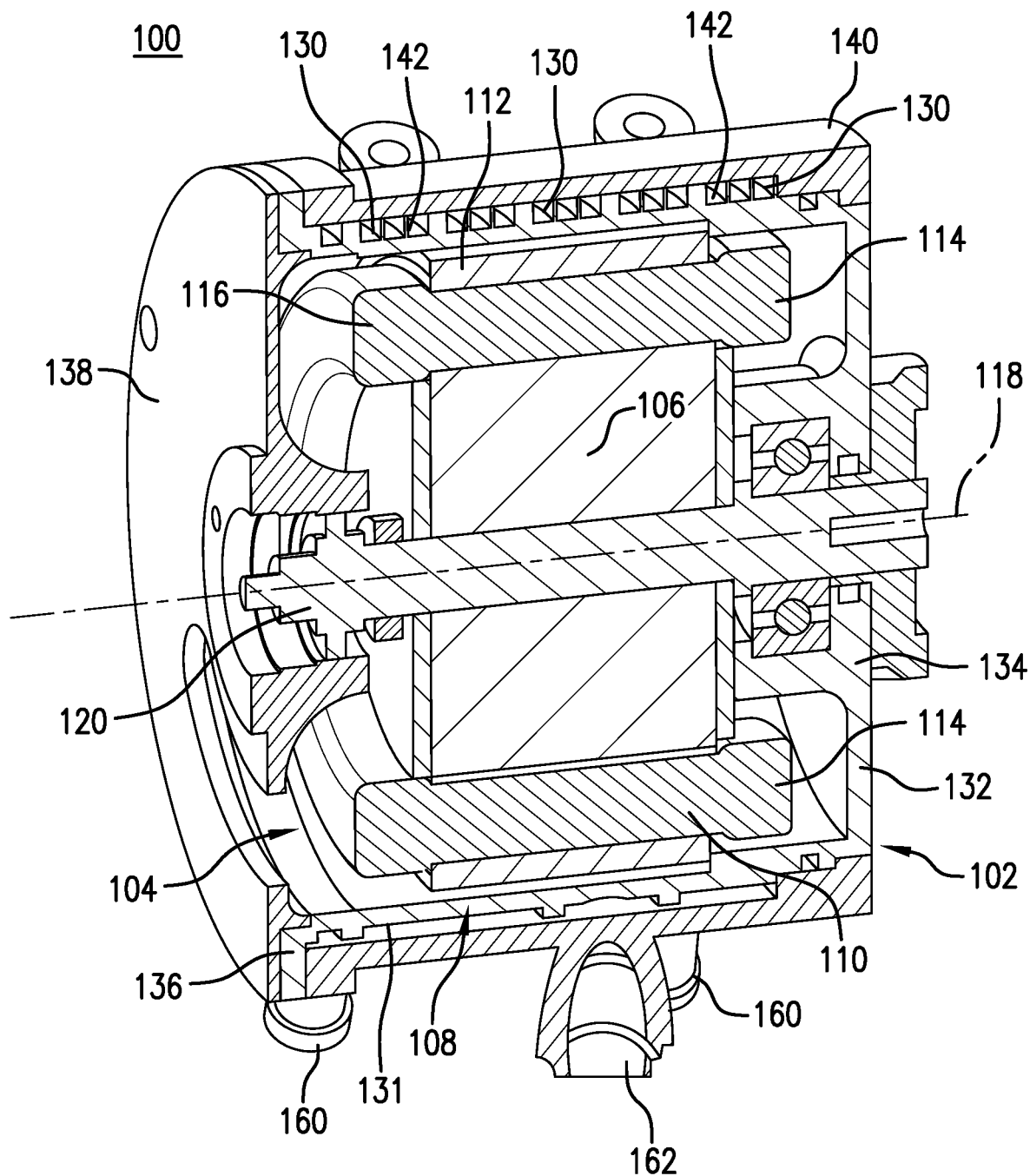
FIG. 1 is a cross-sectional view of an electric machine and a cooling assembly that includes cooling channels between an inner shell and an outer shell, according to one or more embodiments.
Figure 2:
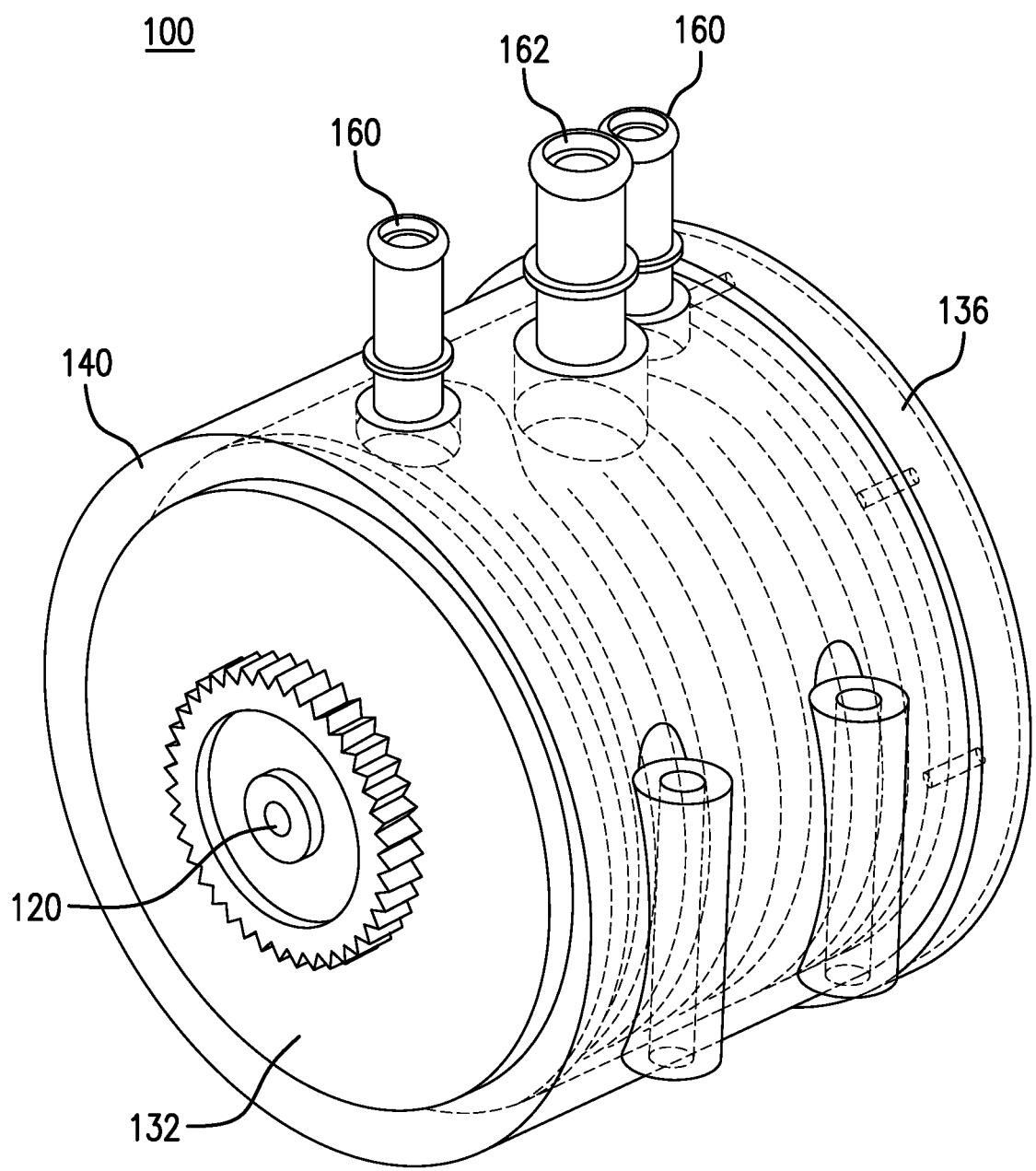
FIG. 2 is a perspective view of the cooling assembly of FIG. 1, in accordance with one or more embodiments.
Figure 3:
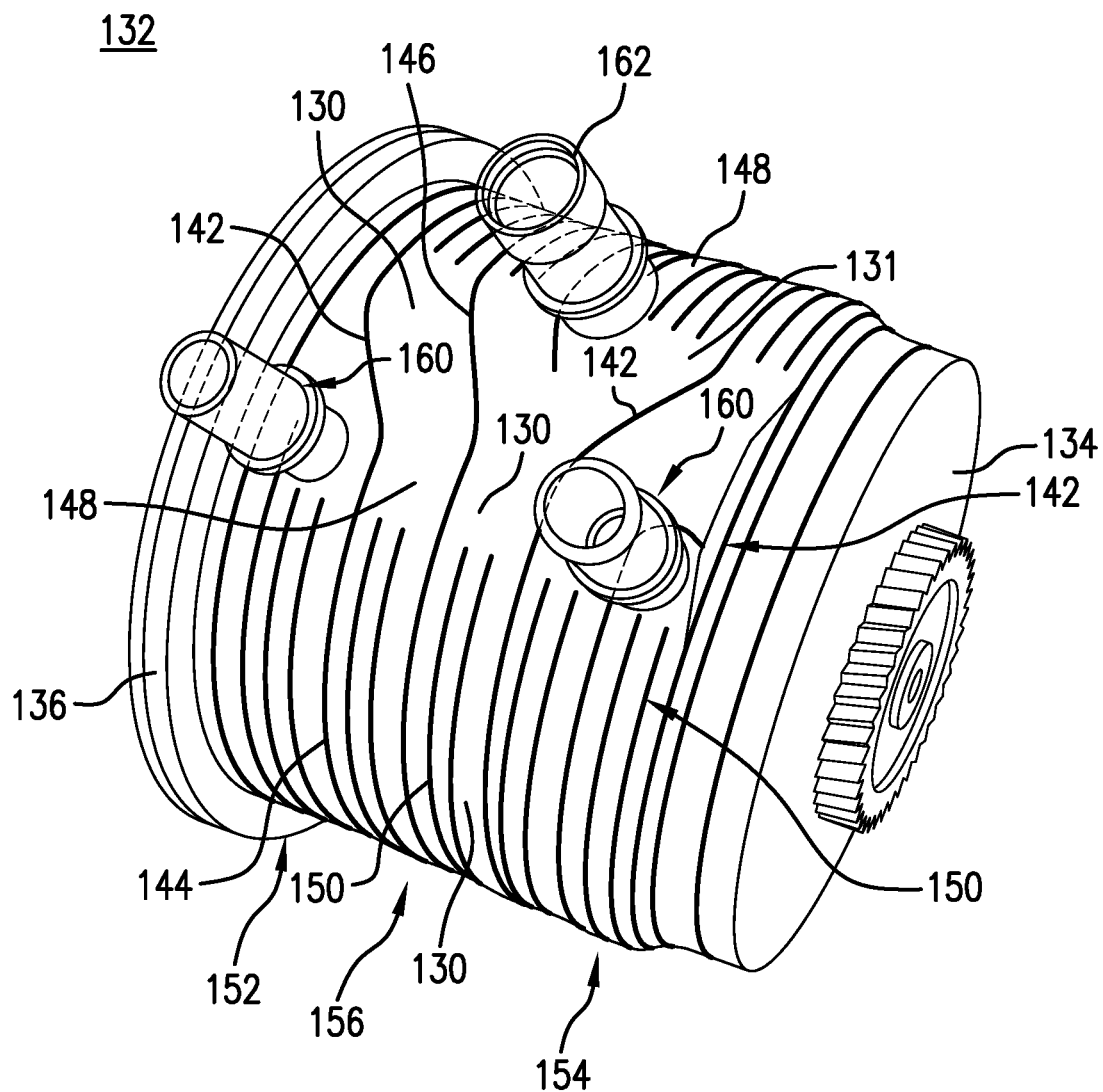
FIG. 3 depicts the inner shell of FIG. 1, in accordance with one or more embodiments.

FIGS. 1-3 illustrate an embodiment of an electric machine system 100 that includes a cooling assembly 102 attached to an electric machine 104. In one embodiment, the electric machine 104 is a permanent magnet electric machine such as a Permanent Magnetic Synchronous Motor (PMSM). PMSMs are widely used in actuators and in vehicle propulsion systems. It is noted that the embodiments described herein are not limited to permanent magnet machines, and can be used with any suitable electric machine (e.g., an electric motor or generator).

The electric machine 104 includes a rotor 106 having one or more permanent magnets therein, and a stator 108 having conductive windings 110 supported by a stator yoke 112. The windings 110 extend through the yoke 112 and form end turns 114 and 116 (also referred to as end windings 114 and 116) at each opposing end of the stator 108. Electric current supplied to the windings 110 generates a rotating magnetic field that interacts with a magnetic field generated by the permanent magnets, causing the rotor 106 to rotate about a central longitudinal axis 118. The axis 118 is also the central axis of the cylindrical stator 108. The rotor 106 may be connected to a drive shaft 120 or other mechanism to transfer rotational movement to a desired device or component.

The cooling assembly 102 includes a plurality of cooling channels 130 that follow circumferential paths in a surface 131 (also referred to as a first surface or a cooling surface 131) that surrounds at least part of the electric machine 104. The cooling channels 130 direct cooling fluid, such as oil or water, along circumferential fluid paths around the electric machine 104 to absorb and carry heat energy from the electric machine 104. As discussed further below, the cooling surface 131 may be defined by a separate component that surrounds all or part of the stator 108. For example, the surface can be an outer surface of an inner shell 132, which extends axially along the extent of the stator yoke 112 and the end windings 114 and 116.

It is noted that an "axial" direction or an "axially extending" component refers to a direction or component that extends at least partially parallel to the longitudinal axis 118. A "circumferential" direction or "circumference" refers to a circumference that is orthogonal to the longitudinal axis 118 and has a center at the longitudinal axis 118.

In one embodiment, shown in FIGS. 1-3, the cooling channels 130 are defined by features attached to or formed on the inner shell 132. The inner shell 132 may be a cylindrical body having an inner diameter that is greater than or equal to a diameter of the stator 108 and/or the stator yoke 112. For example, the inner shell 132 is contoured or shaped to allow it to be inserted over and fixedly disposed relative to the stator yoke 112. In one embodiment, the inner shell 132 has a cover portion 134 at one end of the electric machine 104 and a flange portion 136 that is secured to a support plate 138 or other support structure of the electric machine 104. The inner shell 132 may be attached to the support plate 138 or other structure in a fluid tight configuration, and may form an air volume around the stator 108.

The cooling assembly 102 may also include a jacket or outer shell 140 that surrounds the cooling surface 131 and defines a fluid tight chamber therebetween. In one embodiment, the outer shell 140 is attached to the inner shell 132, such that a toroidal chamber is formed between the inner shell 132 and the outer shell 140.

In another embodiment, which is discussed in further detail below, the cooling surface 131 is defined by a surface of the stator yoke 112 and establishes a toroidal chamber around the stator yoke 112. In this embodiment, the cooling channels 130 are disposed directly on the surface of the stator yoke 112.

Referring to FIG. 3, in one embodiment, the cooling channels 130 are configured so that as cooling fluid flows circumferentially, at least some of the cooling channels direct the cooling fluid between end regions 152 and 154 of the chamber and a central region 156 of the chamber. As described herein, a "central region" is a circumferential volume or region of the chamber that is centrally located along the longitudinal axis 118 between the ends of the electric machine 104. "End regions" refer to circumferential volumes or regions of the chamber that are located along the longitudinal axis 118 at or near the ends of the electric machine 104.

In one embodiment, the features of the cooling surface 131 (e.g., on the inner shell 132 or on a surface of the stator) are elongated raised features on the outer surface of the inner shell. Alternatively or in addition to the raise features, the feature may include grooves or other elongated depressions that establish fluid paths.

For example, as shown in FIG. 3, the features include ridges or ribs 142, which are elongated raised features on the outer surface of the inner shell 132. All or some of the ribs 142 have a straight portion 144 that extends circumferentially and at least substantially parallel to the circumference defined by the ends of the electric machine 104. All or some of the ribs 142 also have a curved or spiral portion 146 that extends toward or away from the central region 156. The ribs 142 thus define one or more fluid paths 148 that direct the cooling fluid in a direction parallel to the circumference and in a direction toward or away from the central region 156. Parallel channels at or near the end regions 152 and 154 ensure that there are no "dead zones" where cooling fluid can become trapped within the cooling assembly 102.

In one embodiment, additional ribs or other features may be included on the cooling surface 131 in addition to the ribs 142. In this embodiment, the ribs 142 are referred to as primary ribs 142. For example, as shown in FIG. 3, the inner shell 132 includes the primary ribs 142 and secondary ribs 150 that function to facilitate directing the cooling fluid along the fluid paths 148, and increase the surface area of the cooling surface 131 and/or the inner shell 132. Although the secondary ribs 150 are shown as disposed along straight portions of the fluid paths 148, the secondary ribs 150 may be located at other portions (e.g., curved portions of the fluid paths 148.

Figure 4:
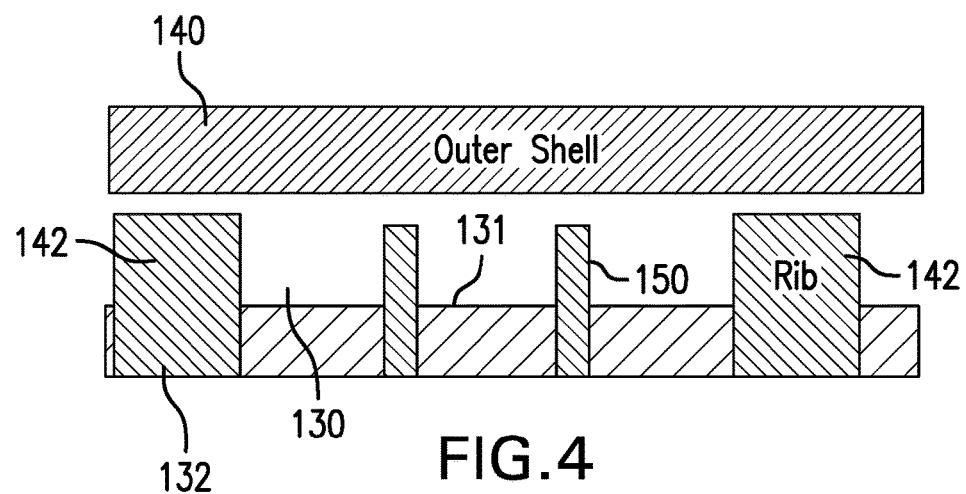
FIG. 4 depicts an example of ribs that define cooling channels of an electric machine cooling assembly, in accordance with one or more embodiments.

In one embodiment, the ribs 142 extend outwardly from the cooling surface 131 toward the outer shell 140. Referring to FIG. 4, the ribs 142 may be elongated rectangular protrusions configured to form the cooling channels 130 therebetween. The ribs 142 may be configured so that the tops of the ridges contact or are proximate to an inner surface of the outer shell 140. For example, as shown in FIG. 4, the ribs 142 have a height associated with a selected clearance or gap between the ribs 142 and the inner surface of the outer shell 140. In one example, the clearance is selected to be about 0.25 millimeters, although any suitable clearance value may be selected.

The width of the cooling channels 130 and the width and height of the ribs 142 can be selected based on a number of considerations. Examples of such considerations include machine dimensions, intended joules dissipation, and/or pressure drop.

It is noted that, although embodiments are described in which the ribs 142 and/or the secondary ribs 150 extend from the cooling surface 131, they are not so limited. For example, the ribs 142 and/or the secondary ribs 150 can be attached to or integral with the outer shell, and extend from an inner surface of the outer shell 140.

Referring again to FIGS. 1-3, in one embodiment, the cooling assembly 102 includes one or more inlets 160 connected to a source of cooling fluid and configured to introduce cooling fluid into the chamber formed between the cooling surface 131 and the outer shell 140. The cooling assembly 103 also includes one or more outlets 162 from which the cooling fluid exits the chamber after circulating along the fluid paths 148. The cooling fluid may be circulated within a closed system, e.g., water or other fluid is continuously recirculated through the cooling assembly.

In one embodiment, the one or more inlets 160 and the one or more outlets 162 are positioned so that cooling fluid travels between the end regions 152 and 154 and the central region 156. The inlet(s) 160 and the outlet(s) 162 may be formed integral with the outer shell 140 or attached to the outer shell 140. The one or more inlets 160 are connected to a fluid source such as a water source or an oil source, and are configured to direct cooling fluid into and out of the chamber formed between the cooling surface 131 and the outer shell 140. The one or more inlets 160 and/or the one or more outlets 162 may include or be connected to components that facilitate circulation of fluid, such as one or more valves.

In one embodiment, the outer shell 140 includes two inlets 160 located at or near the end regions 152 and 154. The outer shell 140 also includes one outlet 162 located at the central region 156.

Figure 5A:
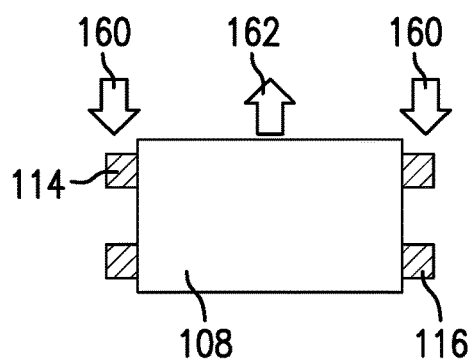
FIGS. 5A-5C depict examples of inlets and outlets of an electric machine cooling assembly, in accordance with one or more embodiments.
Figure 5B:
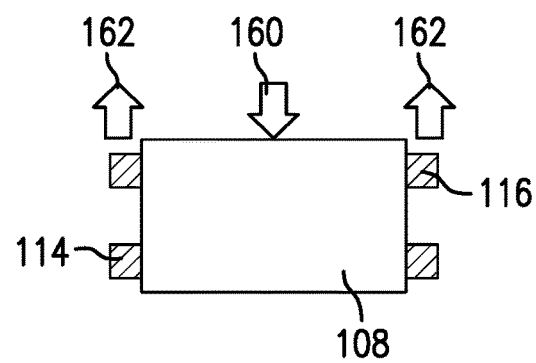
Figure 5C:
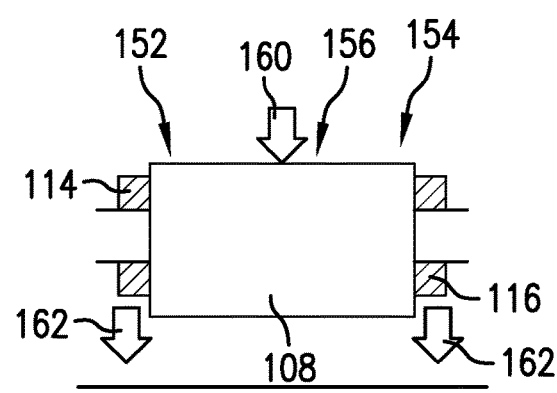

FIGS. 5A-5C show examples of various configurations of the inlet(s) 160 and the outlet(s) 162. In one example, shown in FIG. 5A, the inlets 160 are located at or near the end regions 152 and 154 (similar to the embodiment of FIGS. 1-3) and an outlet 162 is located at the central region 156. In another example, shown in FIG. 5B, an inlet 160 is located at the central region 156 and two outlets 162 are located at or near the end regions 152 and 154.

In a further example, shown in FIG. 5C, the outlets 162 are located near the end regions 152 and 154 and proximate to the end windings 114 and 116 (e.g., as collectors for end-winding oil drips). For example, the cooling assembly 102 is configured for oil drip cooling, where oil is introduced through the central inlet 160 and allowed to advance through the cooling channels 130 to the end regions 152 and 154, where the oil is dripped from outlets 162 and collected via a sump.

The cooling assembly 102 can be combined with other cooling techniques and systems. For example, the cooling assembly 102 can be combined with other cooling techniques such as end winding oil spray (e.g., through rotor nozzles) or end winding potting.

Figure 6:
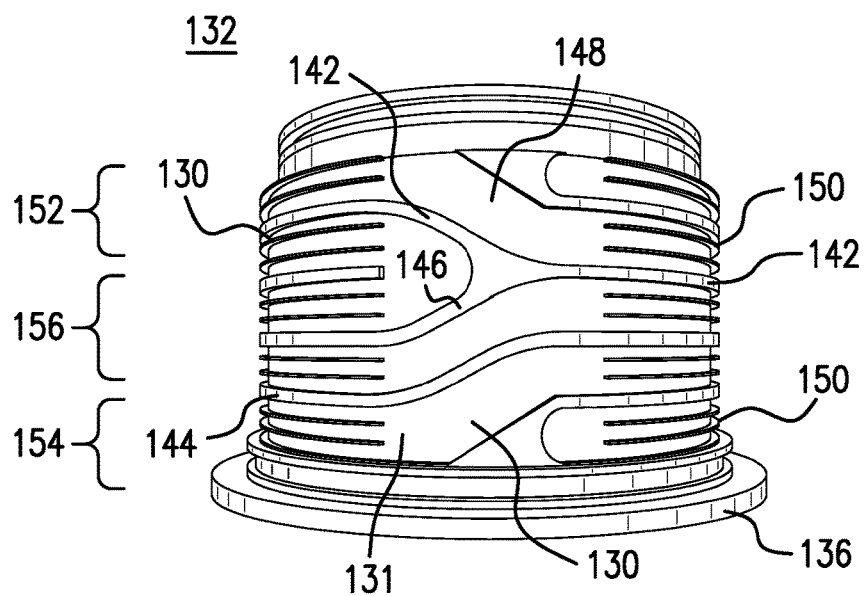
FIG. 6 depicts an example of the inner shell of FIG. 1, in accordance with one or more embodiments.
Figure 7:
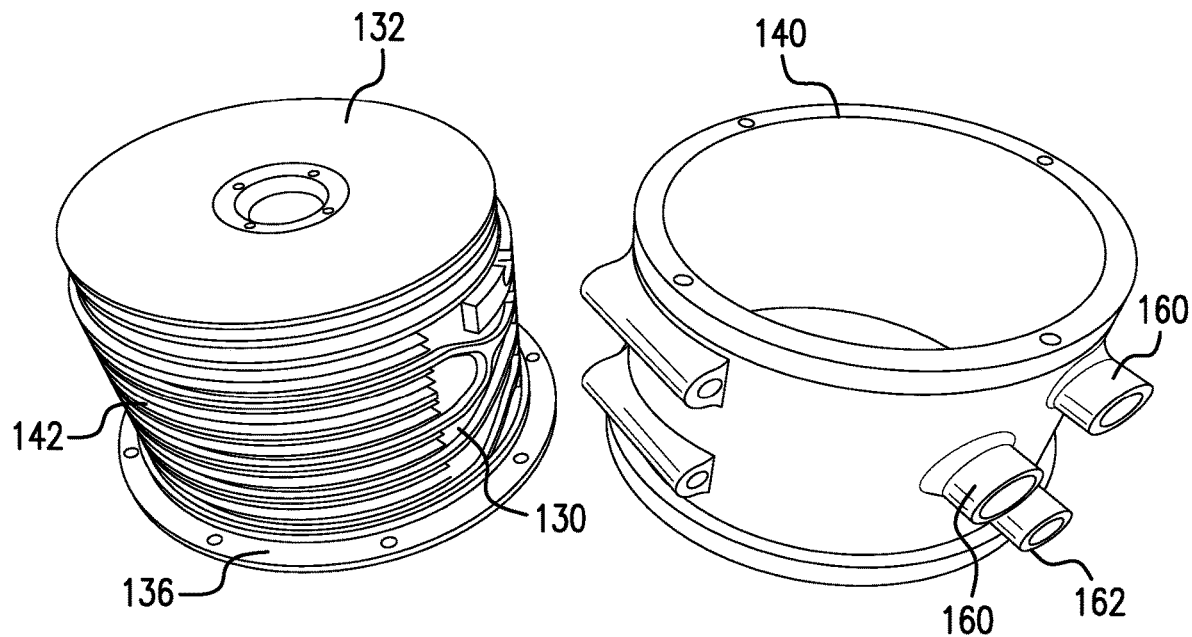
FIG. 7 depicts an example of the inner shell and the outer shell of FIG. 1, in accordance with one or more embodiments.

The inner and outer shells may be made from any suitable material, such as a thermally conductive metal or other material. For example, FIGS. 6 and 7 show an embodiment of the inner shell 132 and the outer shell 140, which are made from aluminum. The shells may be cast, machined or manufactured in any other suitable manner.

Figure 8:
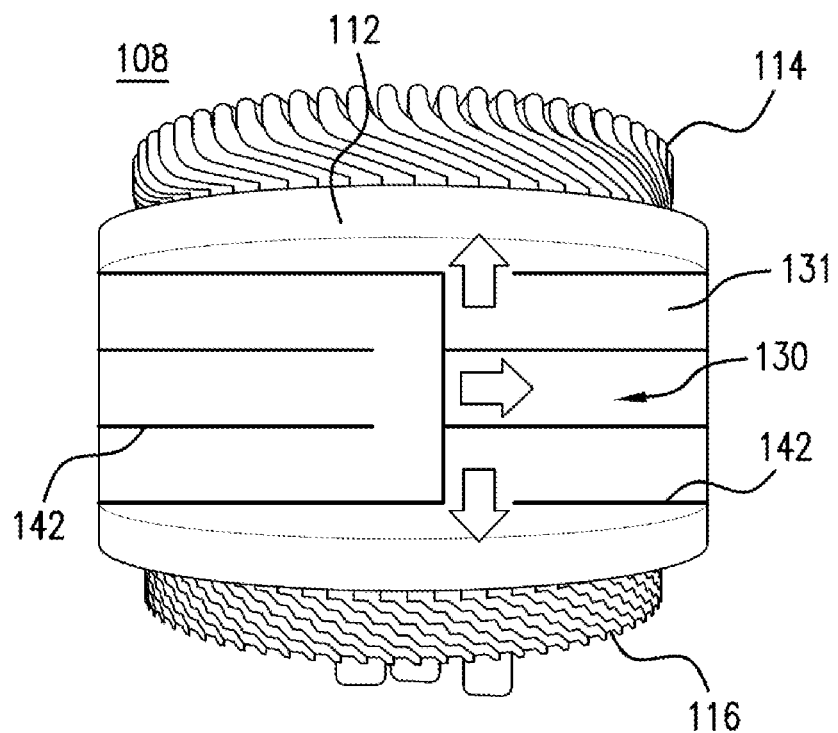
FIG. 8 depicts an electric machine stator having cooling channels, in accordance with one or more embodiments.

Referring to FIG. 8, in one embodiment, the cooling channels 130 are formed directly on or near an exterior surface of the stator 108. The cooling channels 130 may be defined by ribs 142, secondary ribs 150 and/or other raised features that are attached to an exterior surface of the stator yoke 112 or integrally formed with the stator yoke 112. For example, the stator yoke 112 includes cooling channels 130 formed in the surface of the stator yoke 112 (e.g., defined by indentations or grooves in the stator yoke 112). As shown in FIG. 8, the cooling channels are defined by ribs 142. In one embodiment, the cooling channels 130 are formed as the stator yoke 112 is manufactured, by assembling non-identical or uneven laminations.

Figure 9:
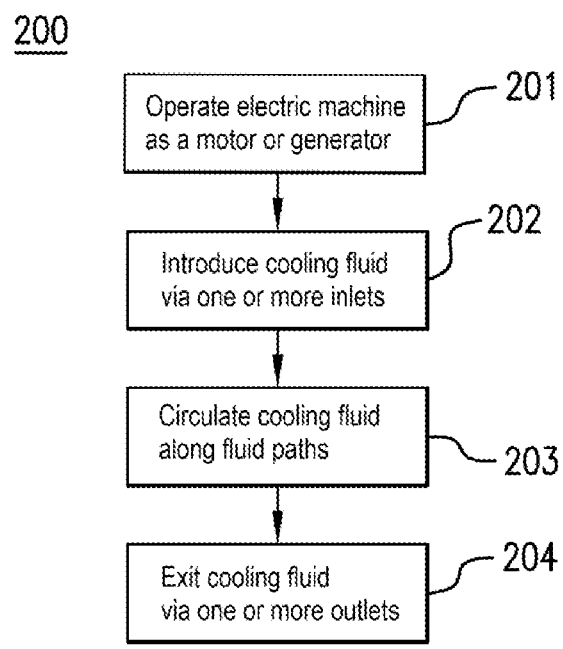
FIG. 9 is a flow chart depicting a method of cooling an electric machine, in accordance with one or more embodiments.

FIG. 9 illustrates an embodiment of a method 200 for operating an electric machine and cooling the electric machine during operation. Aspects of the method 200 may be performed manually, via mechanical actuators and/or performed by a computer or processor. Although the method 200 is discussed in conjunction with the system 100, the method 200 is not so limited. The method 200 is discussed in conjunction with blocks 201-204. The method 200 is not limited to the number or order of steps therein, as some steps represented by blocks 201-204 may be performed in a different order than that described below, or fewer than all of the steps may be performed.

At block 201, the electric machine 104 is operated as a motor or generator. For example, the electric machine 104 is part of a vehicle propulsion system or an actuator (e.g., for various vehicle systems and devices).

At block 202, cooling fluid is introduced via one or more inlets 160. For example, water is pumped through a fluid line into an inlet 160 located at the central region 156 of the chamber. In this example, the chamber is defined by the cooling surface 131 (e.g., a surface of the inner shell 132) and the outer shell 140.

At block 203, the cooling fluid is circulated along fluid paths 148 established by ribs 142 and secondary ribs 150. As the cooling fluid advances circumferentially, the cooling fluid is directed away from the central region 156 and to end regions 152 and 154 of the chamber.

At block 204, the circulated cooling fluid exits the chamber via one or more outlets 162. For example, the cooling fluid exits through outlets 162 located at the end regions 152 and 154.

Figure 10:
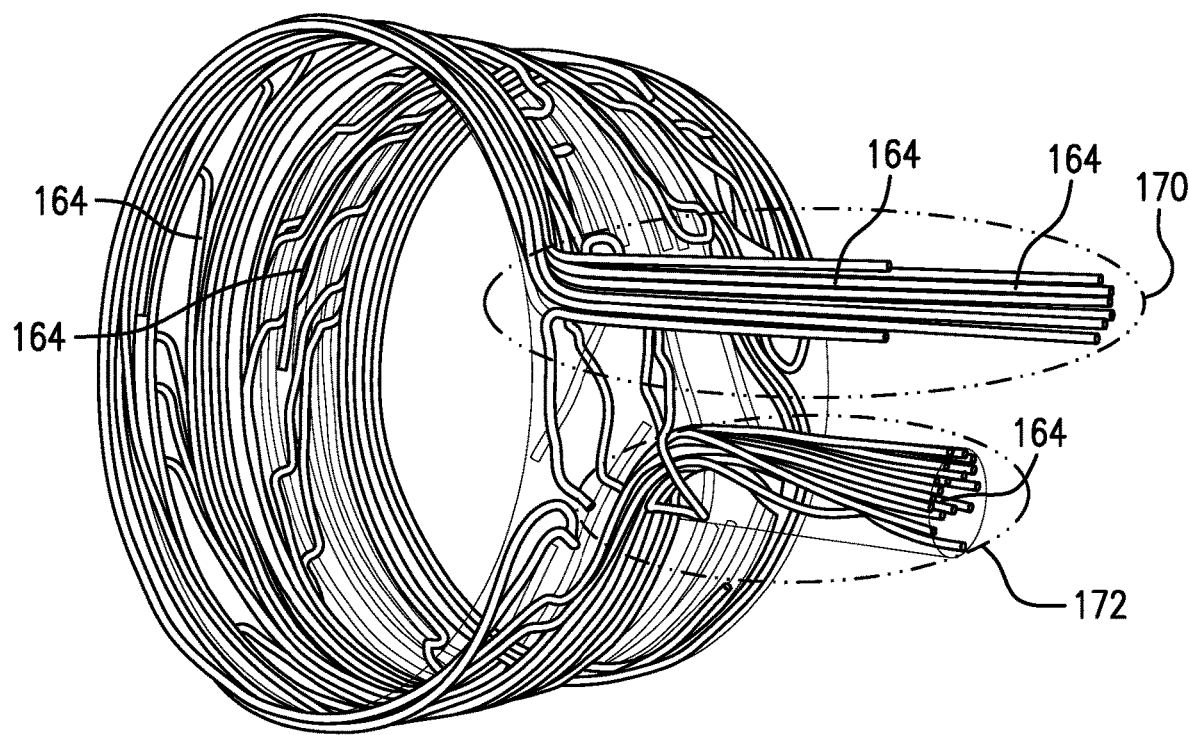
FIG. 10 illustrates flow characteristics of cooling fluid through the cooling assembly of FIG. 1, in accordance with one or more embodiments

FIG. 10 illustrates an example of fluid flow through the cooling assembly 102. In this example, cooling fluid 164 is introduced through inlets 160 at the end regions 152 and 154 of the cooling assembly 102, as shown in area 170. The cooling fluid 164 circulates along various fluid paths 148 and exits through a central outlet 162, as shown in area 172.

This example illustrates how heat is removed from the electric machine. As fluid is circulated, heat at the end regions increases the temperature of the fluid. The fluid temperature is again increased as heat energy is transferred from the end regions to the central region, accumulates at the central region, and is removed from the electric machine 104 via the central outlet 162. This example also demonstrates how cooling fluid is effectively circulated without resulting in dead zones at the end regions.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for cooling an electric machine, the apparatus comprising:
a plurality of fluid channels disposed in a first surface that surrounds at least part of the electric machine, the electric machine including a rotor surrounded by a cylindrical stator, the rotor and the stator having a central longitudinal axis, the electric machine having a first end and a second end, the first end defining a first circumference around the longitudinal axis, the second end opposing the first end and defining a second circumference around the longitudinal axis,
wherein each of the plurality of fluid channels defines a circumferential path in the first surface, including a first channel section that extends at least substantially parallel to the first circumference and the second circumference, and including a second channel section configured to direct a cooling fluid between a central region of the first surface and an end region of the first surface, the first channel section including a plurality of secondary channel sections therein, the plurality of secondary channel sections terminating at the second channel section; and
an outer shell configured to surround the first surface and define a fluid tight chamber between the first surface and the outer shell, the plurality of fluid channels extending circumferentially through the chamber, the outer shell having at least one inlet through which the cooling fluid is introduced into the chamber and at least one outlet from which the cooling fluid exits the chamber.

2. The apparatus of claim 1, wherein the at least one inlet includes a first inlet disposed proximate to a first end region of the first surface and a second inlet disposed proximate to a second end region of the first surface, and the at least one outlet is disposed proximate to the central region.

3. The apparatus of claim 1, wherein the at least one inlet is disposed proximate to the central region, and the at least one outlet includes a first outlet disposed proximate to a first end region of the first surface and a second outlet disposed proximate to a second end region of the first surface.

4. The apparatus of claim 3, wherein the cooling fluid is oil, the stator includes a plurality of windings having opposing end windings and a stator yoke, and the first outlet and the second outlet are configured as end winding oil drip outlets.

5. The apparatus of claim 1, wherein the plurality of fluid channels are formed by a plurality of ribs that establish circumferential fluid paths on the first surface, each of the plurality of ribs including a straight portion that is at least substantially parallel to the first circumference and the second circumference, and a curved portion that extends toward the central region.

6. The apparatus of claim 1, wherein the plurality of ribs include a plurality of primary ribs and at least one secondary rib, each primary rib of the plurality of primary ribs having a straight portion that is at least substantially parallel to the first circumference and the second circumference, and a curved portion that extends toward the central region, the at least one secondary rib disposed between the straight portion of adjacent primary ribs to define the plurality of secondary channel sections.

7. The apparatus of claim 1, further comprising an inner shell surrounding the stator and disposed between the stator and the outer shell, the inner shell defining the first surface.

8. The apparatus of claim 7, wherein the outer shell and the inner shell define the fluid tight chamber, and the fluid channels are bounded within the fluid tight chamber.

9. The apparatus of claim 1, wherein the stator includes a plurality of windings and a stator yoke, and the first surface includes an outer surface of the stator yoke, the plurality of fluid channels formed on the outer surface of the stator yoke.

10. The apparatus of claim 9, wherein the fluid channels are formed by laminations making up the stator yoke.

11. The apparatus of claim 1, wherein the cooling fluid is at least one of an oil-based fluid and a water-based fluid.

12. The apparatus of claim 1, wherein the electric machine is at least one of a synchronous motor, a synchronous generator, an induction motor and an induction generator.

13. The apparatus of claim 1, wherein the electric machine is configured to be a component of a motor vehicle.

14. An apparatus for cooling an electric machine, the apparatus comprising:
a plurality of fluid channels disposed in a first surface that surrounds at least part of the electric machine, the electric machine including a rotor surrounded by a cylindrical stator, the rotor and the stator having a central longitudinal axis, the electric machine having a first end and a second end, the first end defining a first circumference around the longitudinal axis, the second end opposing the first end and defining a second circumference around the longitudinal axis,
wherein each of the plurality of fluid channels defines a circumferential path in the first surface, the plurality of fluid channels including a first channel section that extends at least substantially parallel to the first circumference and the second circumference, and including a second channel section configured to direct a cooling fluid between a central region of the first surface and an end region of the first surface, the first channel section including a plurality of secondary channel sections therein, the plurality of secondary channel sections terminating at the second channel section; and
an outer shell configured to surround the first surface and define a fluid tight chamber between the first surface and the outer shell, the plurality of fluid channels extending circumferentially through the chamber, the outer shell having at least one inlet through which the cooling fluid is introduced into the chamber and at least one outlet from which the cooling fluid exits the chamber,
wherein the at least one inlet includes a first inlet disposed proximate to a first end region of the first surface and a second inlet disposed proximate to a second end region of the first surface, or the at least one outlet includes a first outlet disposed proximate to the first end region and a second outlet disposed proximate to the second end region.

15. The apparatus of claim 14, wherein the at least one inlet or the at least one outlet is disposed proximate to the central region.

16. The apparatus of claim 14, wherein the plurality of fluid channels are formed by a plurality of ribs including a plurality of primary ribs and at least one secondary rib, each primary rib of the plurality of primary ribs having a straight portion that is at least substantially parallel to the first circumference and the second circumference, and a curved portion that extends toward the central region, the at least one secondary rib disposed between the straight portion of adjacent primary ribs to define the plurality of secondary channel sections.

17. The apparatus of claim 14, further comprising an inner shell surrounding the stator and disposed between the stator and the outer shell, the inner shell defining the first surface, wherein the outer shell and the inner shell define the fluid tight chamber, and the fluid channels are bounded within the fluid tight chamber.

18. The apparatus of claim 14, wherein the stator includes a plurality of windings and a stator yoke, and the first surface includes an outer surface of the stator yoke, the plurality of fluid channels formed on the outer surface of the stator yoke.

19. An apparatus for cooling an electric machine, the apparatus comprising:
a plurality of fluid channels disposed in a first surface that surrounds at least part of the electric machine, the electric machine including a rotor surrounded by a cylindrical stator, the rotor and the stator having a central longitudinal axis, the electric machine having a first end and a second end, the first end defining a first circumference around the longitudinal axis, the second end opposing the first end and defining a second circumference around the longitudinal axis,
wherein each of the plurality of fluid channels defines a circumferential path in the first surface, one or more of the plurality of fluid channels including a first channel section that extends at least substantially parallel to the first circumference and the second circumference, and including a second channel section configured to direct a cooling fluid between a central region of the first surface and an end region of the first surface, the first channel section including a plurality of secondary channel sections therein, the plurality of secondary channel sections terminating at the second channel section; and
an outer shell configured to surround the first surface and define a fluid tight chamber between the first surface and the outer shell, the plurality of fluid channels extending circumferentially through the chamber, the outer shell having at least one inlet through which the cooling fluid is introduced into the chamber and at least one outlet from which the cooling fluid exits the chamber, wherein the at least one inlet includes a first inlet disposed proximate to a first end region of the first surface and a second inlet disposed proximate to a second end region of the first surface, and the at least one outlet is disposed proximate to the central region.

20. The apparatus of claim 19, wherein each of the plurality of fluid channels includes a first channel section that extends at least substantially parallel to the first circumference and the second circumference, and includes a second channel section configured to direct the cooling fluid between the central region and the first end region or the second end region.

* * * * *